United States Patent [19]

Bartoli et al.

[11] 4,377,609
[45] Mar. 22, 1983

[54] PROCESS FOR MANUFACTURING A PADDING COMPRISING A FOAM BODY COVERED WITH A PERMEABLE COVER, MADE FOR EXAMPLE FROM FABRIC

[75] Inventors: Michel Bartoli, Etampes; Armand R. Bernard, Mespuits; Daniel Noirot, Etampes, all of France

[73] Assignee: Societe Industrielle Bertrand Faure, Etampes, France

[21] Appl. No.: 137,634

[22] Filed: Apr. 7, 1980

[30] Foreign Application Priority Data

Apr. 26, 1979 [FR] France .......................... 79 10679

[51] Int. Cl.³ .............................................. B29D 27/04
[52] U.S. Cl. ....................................... 428/71; 249/83; 249/161; 264/46.6; 264/161; 264/257; 297/452; 297/DIG. 1; 428/76; 428/306.6
[58] Field of Search ................... 264/46.6, 46.4, 46.7, 264/46.3, 257, 46.9, 161; 249/83, 113, 121, 127; 428/71, 76, 303.6; 297/452, DIG. 1

[56] References Cited

U.S. PATENT DOCUMENTS

| | | | |
|---|---|---|---|
| 1,645,604 | 10/1927 | Lower | 264/46.4 |
| 2,394,122 | 2/1946 | Urmston | 264/46.4 |
| 2,927,876 | 3/1960 | Hoppe et al. | 264/46.6 X |
| 3,093,410 | 6/1963 | Wilson | 297/452 X |
| 3,129,269 | 4/1964 | Charvat | 264/46.9 x |
| 3,246,443 | 4/1966 | Slemmons | 297/DIG. 1 |
| 3,390,214 | 6/1968 | Woods | 264/46.6 X |
| 3,408,106 | 10/1968 | Bolling et al. | 297/452 |
| 3,431,331 | 3/1969 | Pincus et al. | 264/46.6 X |
| 3,490,810 | 1/1970 | Putnam | 297/DIG. 1 |
| 3,493,449 | 2/1970 | Krug | 264/46.4 X |
| 3,737,266 | 6/1973 | Yamamoto | 249/113 X |
| 3,819,232 | 6/1974 | Wagner | 297/DIG. 1 |
| 3,878,277 | 4/1975 | Velte | 264/46.4 |
| 3,932,252 | 1/1976 | Woods | 264/46.6 X |
| 3,952,082 | 4/1976 | Arnaud | 264/46.6 |
| 3,972,565 | 8/1976 | Smith | 297/DIG. 1 |
| 3,978,181 | 8/1976 | Vahle | 264/46.9 X |
| 4,040,881 | 8/1977 | Wallace | 297/DIG. 1 |
| 4,130,614 | 12/1978 | Saidla | 264/46.4 |

FOREIGN PATENT DOCUMENTS

| | | | |
|---|---|---|---|
| 47-20284 | 9/1972 | Japan | 264/46.6 |
| 224668 | 3/1943 | Switzerland | 249/121 |

OTHER PUBLICATIONS

IBM Technical Disclosure Bulletin, "Foamed Air Bearing Cylinder", by R. N. Wood, vol. 3, No. 10, Mar. 1961, p. 22.

*Primary Examiner*—Philip E. Anderson
*Attorney, Agent, or Firm*—Oblon, Fisher, Spivak, McClelland & Maier

[57] ABSTRACT

A process using a mold having at least two complementary parts provided with internal surfaces defining a molding cavity, including placing a cover element on the internal surface of each mold part, extending the periphery of the cover elements beyond that of the internal surfaces, pouring a foaming composition undergoing reaction onto the cover element of one of the mold parts, waiting until the foam further expands and overflows slightly from the part of the mold into which it was poured, applying the other mold part to the first one so as to close the molding cavity, pressing the overflow foam into the extended cover elements, waiting until the foam fully cures, removing the padding from the mold and trimming the cover elements along the line joining them.

4 Claims, 13 Drawing Figures

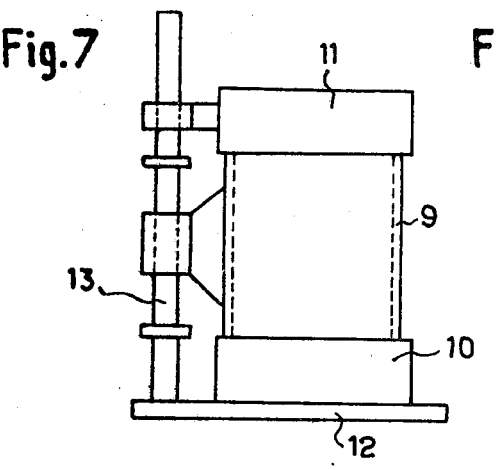
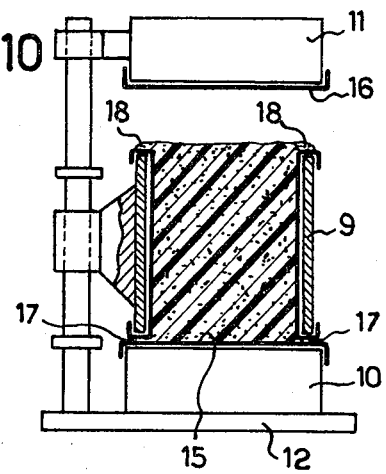
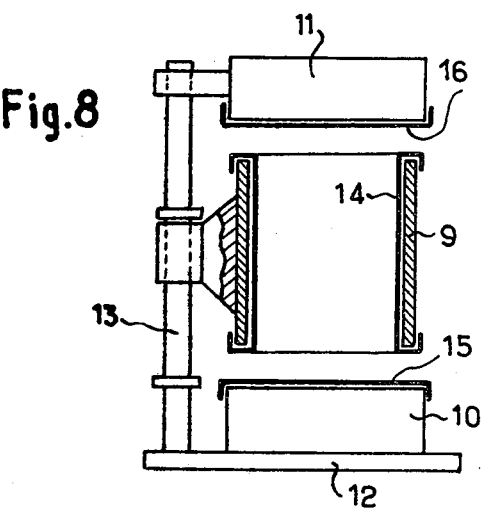
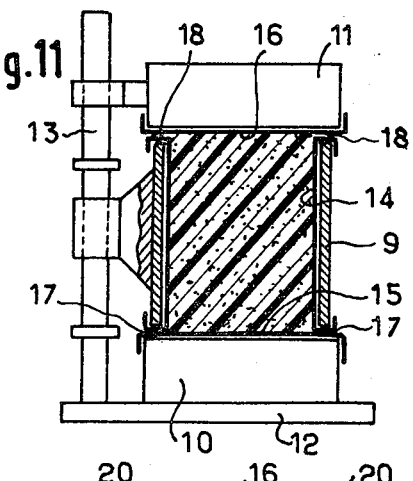
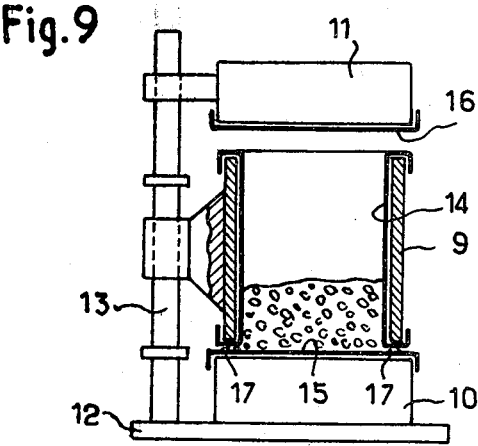
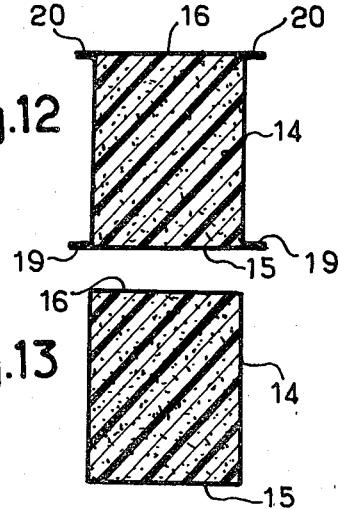
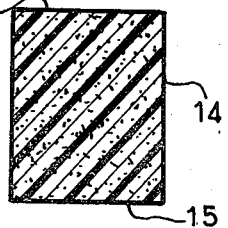

PROCESS FOR MANUFACTURING A PADDING COMPRISING A FOAM BODY COVERED WITH A PERMEABLE COVER, MADE FOR EXAMPLE FROM FABRIC

BACKGROUND OF THE INVENTION

1. Field of the Invention

The present invention relates to a process for manufacturing padding including a foam body covered with a permeable cover, a process in which the foam is formed from a foaming composition poured inside the cover while it is still in a liquid reaction state and whilst it is not yet in its final expansion state.

2. Description of the Prior Art

It should first of all be noted that the word "padding" used here designates any stuffing element entering into the construction of domestic or industrial furnishing articles. It may then designate equally well a cushion, a stuffed part of a seat, such as for example the sitting portion, the seat-back or head-rest, or else a panel for lining the inside of the receptacle of vehicles.

Industrialists have always met numerous difficulties in manufacturing padding from a foaming composition poured inside a permeable cover made from a natural or synthetic textile material. Originally, they used a technique used for manufacturing moulded padding in impermeable covers and then poured the foaming composition in the liquid state on the textile cover. Now, with this technique, the permeable cover is considerably dampened or completely penetrated by the foaming composition which sometimes passes therethrough, which affects the aesthetic appearance of the finished padding and causes in this latter local inacceptable hard portions.

To remedy these drawbacks, some industrialists propose at present processes in which the foaming composition is contacted with the cover when it is in an intermediate state between its liquid state and its final expanded state. With this process they in fact prevent the foaming composition from dampening and passing through the permeable cover. They succeed moreover in causing the foaming composition, which is not entirely hardened during its use, to adhere satisfactorily to its cover.

The manufacture of padding including a foam body covered with a permeable cover in at least two parts has however not been able to be accomplished satisfactorily by using these recent processes. The main difficulties met with come in fact from the use of complicated, impractical and unsuitable equipment for joining the cover elements along a perfectly regular and aesthetically acceptable line.

SUMMARY OF THE INVENTION

The present invention proposes then to remedy the drawbacks mentioned above and for this it provides a manufacturing process which is characterized in that it includes using a mould having at least two complementary parts provided with internal surfaces defining a moulding cavity, in placing a cover element on the internal surface of each mould part, the periphery of the cover elements extending beyond that of the internal surfaces, in pouring the foaming composition undergoing reaction on the cover element of one of the mould parts, in waiting until the foam further expands and overflows slightly from the mould part in which it was poured, in applying the second mould part on the first one so as to close the moulding cavity, in waiting until the foam reaches an advanced stage of polymerization, in removing the padding from the mould and in flushing or trimming the cover elements along their joining line.

In the implementation of this process, it is not necessary to apply the cover elements perfectly against the internal surfaces of the mould parts, the internal pressure of the foam during expansion is in fact sufficient to ensure alone the correct positioning of these elements. Furthermore, since the foaming composition is undergoing reaction when it is poured into the moulding cavity, it only penetrates very superficially into the cover elements. These latter remain then permeable so that the gases formed during expansion of the foam may be discharged outside the moulding cavity, which improves the thermal and hygroscopic comfort of the padding.

By closing the mould only after the foam has begun to overflow from the moulding cavity, there is formed a rim of portion of foam between the facing peripheral parts of the cover elements. Because of its particular position, this rim is then crushed during closing of the mould whereas the foam which forms it is forced to penetrate into the peripheral parts of the cover elements. Now, when the foam hardens, these parts adhere strongly to each other and become more rigid, which allows them to be sectioned or trimmed along a clean sharp line at the level of their roots.

BRIEF DESCRIPTION OF THE DRAWINGS

The above and other objects, features and advantages of the present invention will become apparent from the following description given solely by way of non limiting illustration, when taken in conjunction with the accompanying drawings, wherein like reference characters designate like or corresponding parts throughout the several views, and wherein:

FIGS. 7 to 13 illustrate the different steps in the manufacture of foam padding the body of which is covered by a three-piece cover.

DETAILED DESCRIPTION OF THE PREFERRED EMBODIMENTS

The padding produced by using the process the steps of which are illustrated in FIGS. 1 to 6 may be for example a cushion, the sitting portion of a seat, an interior lining panel for a motor vehicle, a sun-shade or other. For its manufacture, a two part mould is used including a mould bottom 1 enclosing a moulding cavity 2 and a lid 3 for applying on the mould bottom so as to close the cavity.

Figure 1:
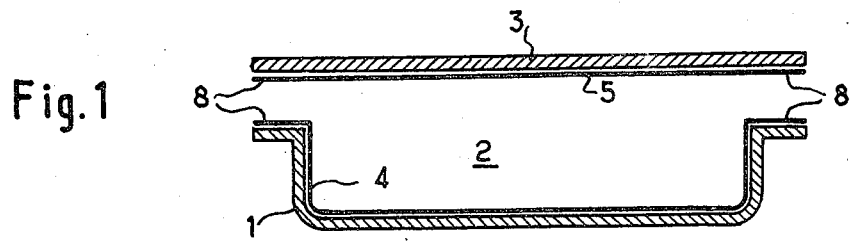
FIGS. 1 to 6 illustrate the different steps in the manufacture of a foam padding the body of which is covered with a two piece cover.
Figure 2:
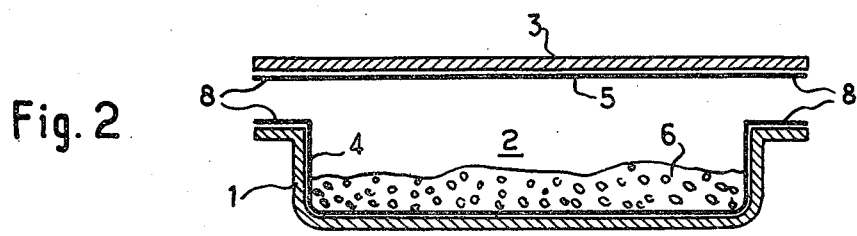

A cover element 4 is first of all placed on the internal surface of the cavity of the mould bottom and a cover element 5 on the lower face of the lid (see FIG. 1). These cover elements are preferably both made from a permeable material such as a natural or synthetic fabric and may have different colors. Their dimensions are moreover chosen so that their peripheries extend beyond that of the entry or edge of the moulding cavity.

Then a foaming composition 6 in the form of a cream, i.e. which has not yet reached its final expanded condition (see FIG. 2), is poured on cover element 4. The foaming composition, the reaction elements of which are for example elements generating a polyurethane foam, is preferably highly catalyzed so as to expand rapidly. It will be noted here that the foaming composition, considering its condition when it is poured, does not dampen or penetrate completely the cover element and so does not risk forming marks on the outer surface of the padding.

Figure 3:
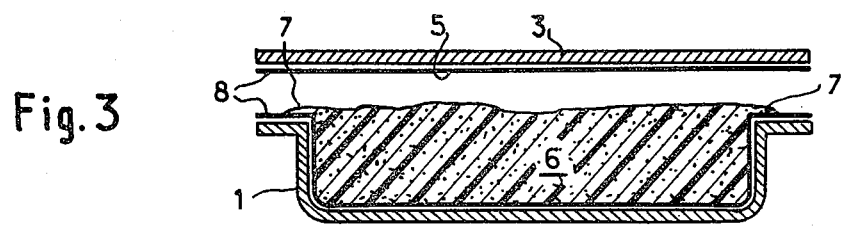
Figure 4:
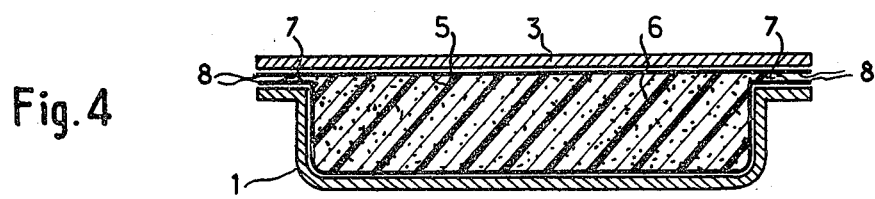
Figure 5:
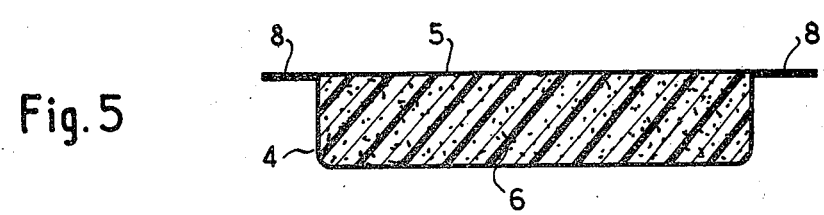

After pouring the foaming composition, one waits until it expands and begins to overflow from the moulding cavity to form a slight rim 7 around the entrance thereof (see FIG. 3).

Then lid 3 is applied to the mould bottom so as to close the moulding cavity. Rim 7 is then crushed between the peripheral parts of the two cover elements, which forces the foam forming it to penetrate into these peripheral parts (see FIG. 4). When the mould is closed, the internal pressure of the foam applies the cover elements perfectly against the internal surfaces of the two mould parts and provides then faithful reproduction of the patterns which may be formed on these surfaces. Furthermore, as the polymerization of the foaming composition proceeds, the reaction gases escape through the cover elements whereas the foam formed adheres progressively thereto.

Figure 6:
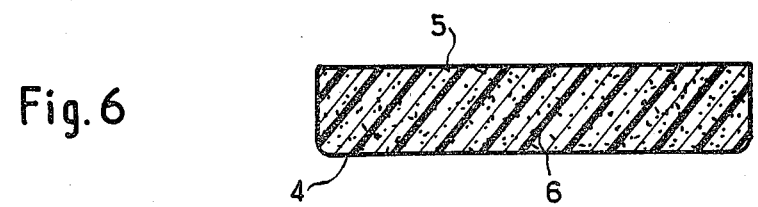

Then, when the polymerization of the foam has reached an advanced stage, the padding is removed from the mould (see FIG. 5) and the cover elements are flushed or trimmed along the line joining them (see FIG. 6). It will be noted here that this latter operation is facilitated by the relatively great stiffness which the peripheral parts 8 of the cover elements present following polymerization of the foam introduced by force therebetween.

The padding formed in accordance with the process illustrated in FIGS. 7 to 13 is a head-rest for motor vehicles. For its manufacture a three-part mould is used such as the one shown from the front in FIG. 7 and which includes a vertical sleeve 9 open at both its ends, a bottom-forming plate 10 situated under the lower end of the sleeve, and a lid-forming plate 11 situated above the other end of the sleeve. In the example shown, plate 10 is fixed and rests on a base 12 whereas sleeve 9 and plate 11 are vertically movable along a guide column 13 resting on base 12, appropriate control mechanism being provided for moving the sleeve and plate 11 in relation to each other as well as in relation to plate 10.

The manufacturing operations are carried out in the following way. A cover element 14 is first of all placed on the inner surface of the sleeve, a cover element 15 on the upper face of plate 10 and a cover element 16 on the lower face of plate 11 (see FIG. 8). These cover elements are all three preferably made from a permeable material such as a textile.

Then sleeve 9 is brought close to plate 10 while leaving a slight gap therebetween (see FIG. 9) and the foaming composition is poured on to cover element 15. The foaming composition which is intended to form a synthetic foam, for example polyurethane, is poured when it has already lost its initial state of fluidity and when it has not yet reached its final expanded condition. It then escapes slightly through the gap provided between the cover elements of the sleeve and plate 10 and forms a small rim 17. The height of the gap is chosen depending on the nature of the cover elements 14 and 15 and on that of the foaming composition.

After pouring the foaming composition, one then waits until the foam formed has expanded sufficiently to overflow slightly from the upper part of the sleeve and to form a slight rim 18 around the entrance thereto (see Fig. 10).

Then the sleeve is lowered against plate 10 so as to close the gap initially provided therebetween and plate 11 is applied against the upper end of the sleeve (see FIG. 11). During this step, the two rims are crushed whereas the foam which forms them is forced into the peripheral parts of the corresponding cover elements.

ponent parts of the mould closed, one waits until the polymerization has reached an advanced stage after which the padding thus formed is removed from the mould (see FIG. 12). All that is then required is to flush the peripheral parts 19 and 20 of the cover elements which remain visible at the lower and upper edges of the padding (see FIG. 13). The steps for manufacturing the padding shown in FIG. 13 present then very great similarities with those required for manufacturing the padding of FIG. 6.

Considering the above description, it will be readily understood that the process of the present invention provides easy manufacture of padding having a permeable cover made from at least two parts, whose appearance and finish are clean and carefully prepared.

It is apparent that within the scope of the invention, modifications and different arrangements can be made other than are here disclosed. The present disclosure is merely illustrative with the invention comprehending all variations thereof.

We claim:

1. A process for manufacturing padding having a body made from foam covered with a permeable cover and using a foaming composition in a liquid reaction state prior to a final expanded state and using a vertical sleeve having upper and lower open end portions respectively provided with upper and lower peripheral lip portions, a bottom plate having a peripheral lip portion situated below and complementary with said lower peripheral lip portion of said vertical sleeve, a top plate having a peripheral lip portion situated above and complementary with said upper peripheral lip of said vertical sleeve, each of said peripheral lip portions being provided for securing said cover and said foaming composition between corresponding complimentary peripheral lip portions so as to define a molding cavity, and using first, second and third permeable cover elements, wherein said process comprises:

placing said first permeable cover element on an internal surface of said vertical sleeve to form a vertical sleeve lining;

extending the outer periphery of said first permeable cover element over said upper and lower peripheral lip portions of said vertical sleeve;

placing said second permeable cover element on an internal surface of said bottom plate to form a bottom plate lining;

extending the outer periphery of said second permeable cover element over said peripheral lip portion of said bottom plate;

placing said third permeable cover element on an internal surface of said lid plate to form a lid plate lining;

extending the outer periphery of said third permeable cover element over said peripheral lip portion of said lid plate;

providing a first gap between said peripheral lip portion of said bottom plate and said lower peripheral lip portion of said vertical sleeve;

providing a second gap between said peripheral lip portion of said lid plate and said upper peripheral lip portion of said vertical sleeve;

pouring said foaming composition in said liquid reaction state onto said first and second permeable cover elements such that said foaming composition does not penetrate said first and second permeable cover elements;

expanding said foaming composition so as to overflow at least slightly from said first and second gaps such that first and second rim portions of said foaming composition extend over said outer periphery of said first and second permeable cover elements so as to at least partially overlap and cover said outer periphery of first and second permeable cover elements;

placing said vertical sleeve on said base plate and placing said lid plate on said vertical sleeve so as to form and close said molding cavity;

pressing said complementary peripheral lip portions into abutting contact such that said first and second rim portions of said foaming composition respectively penetrate said first and second permeable cover elements and said first and third permeable cover elements;

fully curing said foaming composition to form a fully cured foam such that said fully cured foam adheres to said first, second and third permeable cover elements along the respective outer peripheries thereof;

removing said fully cured foam and said first, second and third permeable cover elements from said molding cavity; and trimming said peripheral lip portions of said first, second and third permeable cover elements such that said first, second and third permeable cover elements are flush along a line where said first, second and third permeable cover elements abut.

2. A process for manufacturing padding having a body made from foam covered with a permeable cover and using a foaming composition in a liquid reaction state prior to a final expanded state and at least first and second complimentary mold parts defining a molding cavity and each of said first and second complimentary mold parts further comprising a peripheral lip portion disposed around the outer periphery of said first and second complimentary mold parts for securing said cover and said foaming composition therebetween, and at least first and second permeable cover elements, which comprises:

placing said first permeable cover element on the internal surface of said first mold part to form a first mold part lining;

extending the periphery of said first permeable cover element over said peripheral lip portion of said first mold part;

placing said second permeable cover element on the internal surface of said second mold part to form a second mold part lining;

extending the periphery of said second permeable cover element over said peripheral lip portion of said second mold part;

pouring said foaming composition in said liquid reaction state onto at least first permeable cover element of said first mold part such that said foaming composition does not penetrate said first and second permeable cover elements;

expanding said foaming composition so as to at least overflow slightly from said first mold part such that at least one rim portion of said foaming composition extends over said first permeable cover element so as to at least partially overlap and cover the periphery of said first permeable cover element;

placing said second mold part on said first mold part so as to form and close said molding cavity such that said at least one rim portion of said foaming composition is disposed between said peripheral lip portion of said first permeable cover element and said peripheral lip portion of said second permeable cover element;

pressing said peripheral lip portions of said first and second permeable cover elements into abutting contact such that said at least one rim portion of said foaming composition penetrates the periphery of said first and second permeable cover elements;

fully curing the foaming composition such that the fully cured foam adheres to said first and second permeable cover elements;

removing the fully cured foam and said first and second permeable cover elements from said molding cavity; and trimming said peripheral lip portions of said first and second permeable cover elements such that said first and second permeable cover elements are flush along a line where said first and second permeable cover elements abut.

3. The process according to claim 2, said first mold part further comprising a bottom mold in which said molding cavity is formed and said second mold part further comprising a lid mold for closing said molding cavity, wherein said pouring step further comprises pouring said foaming composition onto said first permeable cover element placed on said bottom mold, and wherein said step for placing said second mold part further comprises placing said lid mold on said bottom mold.

4. Padding in accordance with the method of claim 2.

* * * * *